United States Patent [19]

Austrem

[11] Patent Number: 4,460,313
[45] Date of Patent: Jul. 17, 1984

[54] HEAT SHIELD FOR RADIAL GAS TURBINE

[75] Inventor: Ivar Austrem, Hokksund, Norway

[73] Assignee: A/S Kongsberg Vapenfabrikk, Kongsberg, Norway

[21] Appl. No.: 345,355

[22] Filed: Mar. 17, 1982

[51] Int. Cl.$^3$ .............................................. F01D 25/12
[52] U.S. Cl. ....................................... 415/178; 415/177; 415/180; 415/175
[58] Field of Search ............... 415/177, 178, 116, 175, 415/114, 115, 180

[56] References Cited

U.S. PATENT DOCUMENTS

| | | | |
|---|---|---|---|
| 2,440,069 | 4/1948 | Bloomberg | 415/180 |
| 3,167,301 | 1/1965 | Whitaker | 415/177 |
| 3,849,022 | 11/1974 | Amann et al. | 415/116 |
| 3,893,786 | 7/1975 | Rahnke et al. | 415/178 |
| 4,017,207 | 4/1977 | Bell et al. | 415/115 |
| 4,053,254 | 10/1977 | Chaplin et al. | 415/116 |
| 4,083,649 | 4/1978 | Miller et al. | 415/178 |
| 4,101,241 | 7/1978 | Kasuya | 415/178 |
| 4,157,881 | 6/1979 | Kasuya | 415/175 |

*Primary Examiner*—Stephen Marcus
*Assistant Examiner*—Kwon John
*Attorney, Agent, or Firm*—Finnegan, Henderson, Farabow, Garrett & Dunner

[57] ABSTRACT

Two concentric, partially overlapping annular plates mounted on a parallel support plate are provided for partly defining the gas flow path and for shielding bearings, etc. from hot combustion gases in a radial flow gas turbine. The radially outer plate is cooled by compressed air channeled past the plate surface opposite the combustion gases. The compressed air is metered to achieve a temperature distribution decreasing in the radially inward direction for providing sealing contact between the outer edge and the support plate. The radially inner plate is cooled by film cooling using the compressed air exiting the outer plate channel in the vicinity of the overlap.

11 Claims, 1 Drawing Figure

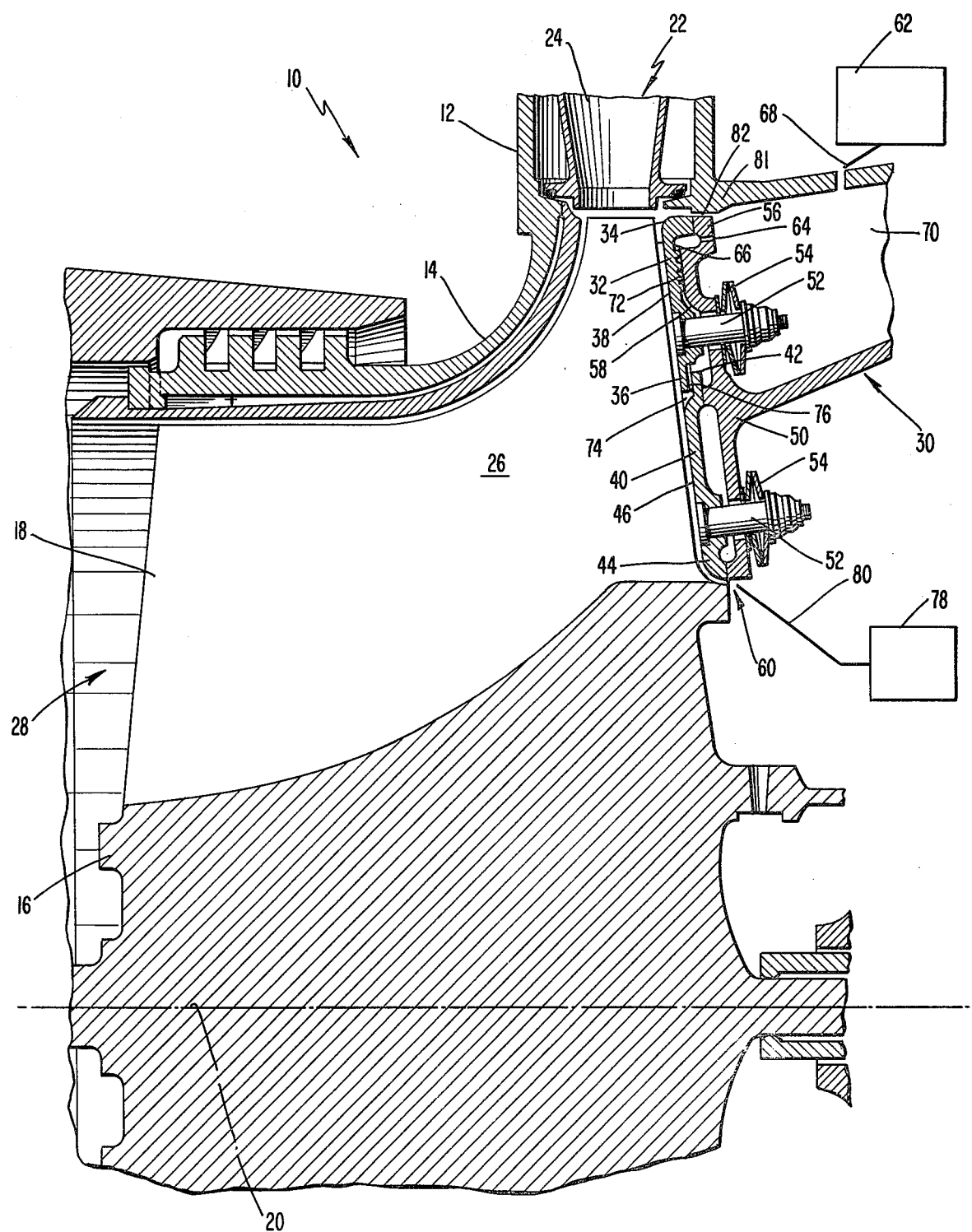

HEAT SHIELD FOR RADIAL GAS TURBINE

BACKGROUND OF THE INVENTION

1. Field of the Invention

This invention relates to apparatus for partly defining the gas flow path and for shielding bearings and other temperature-sensitive components in gas turbines from the high temperatures of the combustion gases.

2. Description of the Prior Art

Modern gas turbine engines can be extremely compact, with temperature-sensitive components such as turbine rotor bearings placed in close proximity to the turbine section in some designs. This has necessitated the use of shielding for protection, which shielding is positioned between the hot combustion gases and the critical components. Also, in a high performance gas turbine, it is of prime importance that the heat shield maintain good clearance between itself and the turbine impeller.

The heat shield in a high performance gas turbine is subjected to extreme thermal conditions, and it is obvious that it cannot survive without efficient cooling. Common practice has been to segment the heat shield and thus reduce the stresses resulting from temperature gradients. However, a segmented heat shield is difficult to cool due to the multiple leak paths between the segments.

Consequently, it is an object of the present invention to provide a heat shield of annular construction to reduce the number of leak paths and thus reduce the required cooling air flow, while maintaining low temperature gradients and good clearance control.

SUMMARY OF THE INVENTION

To achieve the foregoing objects and in accordance with the purpose of the invention, as embodied and broadly described herein, the heat shield apparatus of this invention is used in a gas turbine, the turbine having plurality of blades mounted on a hub for rotation about an axis, the combustion gases entering the turbine at an inlet essentially in the radial direction and leaving at an outlet essentially in the axial direction. The apparatus comprises a first shield member in the form of an annular plate positioned concentric with the hub axis and immediately adjacent the turbine inlet; a second shield member in the form of an annular plate positioned concentric with the hub axis, the second shield member being essentially co-planar with the first shield member and being positioned adjacent to both the first shield member and the hub, the first and second shield members having respective shielding surfaces facing the combustion gas and the turbine outlet and defining, in part, the combustion gas flow path through the turbine; means for supporting the first and second shield members; and means cooperating with the support means for cooling the first and second shield members.

Preferably, the support means includes an annular plate member positioned concentric with the hub axis and adjacent the first and second shield members, at least some portions of the support plate being spaced from the first shield member; the cooling means includes a first source of pressurized gas at a low temperature, relative to the combustion gas temperature, and also means for channeling said pressurized low temperature first gas into the space between the first shield member and the support plate for cooling the surface of the first shield member opposite the first shield member shielding surface, and wherein a radially inner edge of said first shield member and a radially outer edge of said second shield member are configured to form an intershield gap, the gas channeling means also including means for feeding the first coolant gas from the space behind the first shield member through the intershield gap for film cooling the shielding surface of the second shield member.

It is also preferred that a radially outer edge of the first shield member is sealing contacted by the support plate around the periphery of the first shield member, and that the cooling means provides a first shield member temperature distribution decreasing in the radially inward direction for thermally warping the radially outer edge against the support means to augment the sealing contact force.

The accompanying drawing which is incorporated in, and constitutes a part of, this specification, illustrates one embodiment of the invention and, together with the descriptions, serves to explain the principles of the invention.

BRIEF DESCRIPTION OF THE DRAWING

The FIGURE is a schematic cross-sectional representation of a gas turbine having a heat shield made in accordance with the present invention.

DESCRIPTION OF THE PREFERRED EMBODIMENT

Referring to the FIGURE a portion of a gas turbine generally designated 10 is shown including turbine housing 12 having a shroud portion 14, turbine rotor hub 16, and turbine blades 18 mounted on hub 16 for rotation about turbine axis 20.

As depicted, gas turbine 10 is of the radial-inflow axial-outflow type. That is, hot combustion gases are fed from a combuster (not shown) through a turbine inlet designated 22 essentially in the radial direction, although the present invention also encompasses mixed axial and radial inflow configurations. Thereafter, the hot gases flow past inlet guide vanes 24 into the region 26 swept by rotating blades 18 where they are expanded against blades 18 to produce power. The expanded gases leave the turbine at an outlet designated 28, essentially in the axial direction. Thus, the combustion gas flow path through the turbine is defined in part by the housing 12, including shroud 14, and the surface of hub 16 and in part by the heat shield apparatus generally designated 30 to be discussed henceforth. At inlet 22 to the turbine 10 the gas total temperature may be as high as 1200° C. and the static pressure approximately 4 bars. As the combustion gases expand through the turbine region the temperature and pressure can fall to about 600° C. and 1 bar at the turbine outlet 28.

Although not shown in the FIGURE, the bearings and shaft support for the turbine hub 16 would lie to the right of the components pictured in the FIGURE, along axis 20. Thus, it is important to retard the flow of heat in that direction. Moreover, the portion of the combustion flow path boundary occupied by heat shield apparatus 30 is exposed to especially severe conditions as it is proximate the inlet where the highest combustion gas temperatures are encountered and because it is removed from the housing portions where external cooling would be available from the ambient.

In accordance with the invention, there is provided a first shield member in the form of an annular plate positioned concentric with the hub axis and immediately adjacent the turbine inlet. As embodied herein, shield member 32 is positioned concentric with hub axis 20 in a plane essentially perpendicular to axis 20. Shield member 32 has a radially outer edge 34 positioned adjacent inlet 22 and a radially inner edge 36. The orientation of the shield member 32 shown in the FIGURE is such that the shielding surface 38 faces generally in the axial direction, that is, toward turbine outlet 28.

Further in accordance with the present invention, a second annular plate-shaped shield member is provided positioned co-planar with the first shield member. As embodied herein, second shield member 40 has a radially outer edge 42, a radially inner edge 44 positioned proximate hub 16, and a shielding surface 46 for facing the combustion gases in region 26. Shield member 40 also is concentric with hub axis 20 and essentially co-planar with shield member 32. Together, shielding surfaces 38 and 46 define the remainder of the combustion gas flow path through region 26.

Still further in accordance with the present invention, means are provided for supporting the first and second shield members. As embodied herein, the support means includes an annular support plate 50 operatively connected to the engine main structure and positioned parallel to shield members 32 and 40. Shield members 32 and 40 are attached to support plate 50 by bolt and nut assemblies 52. Plate spring washers 54 are included in the bolt and nut assembly for shield member 32 to allow for thermal flexing of that shield during high temperature operation, for reasons that will be explained hereinafter. Plate spring washers are also shown in use with the bolt and nut assembly for shield member 40.

Shield member 32 is spaced from support plate 50 in part by radially outer edge 34 being configured to abut and seal against edge 56 of support plate 50. A passage 58 of controlled thickness dimension is thus created between the support plate 50 and shield member 32. Shield member 40 is supported by plate 50 such that radially inner shield edge 44 is spaced from the surface of hub 16 to form a gap 60 of controlled dimension.

Still further in accordance with the present invention, means cooperating with the support means are provided for cooling the first and second shield members. As embodied herein, a source of high pressure relatively cool gas (designated generally 62) compared to the combustion gases is provided to supply coolant gas to a series of orifices 64 formed in the outer edge 56 of support plate 50. The axes of orifices 64 are such that the coolant gases flowing through orifices 64 impinge on the portion of surface 66 opposite the highest temperature portion of shielding surface 36 of shield member 32. Separate ducting can be provided for connecting source 62 with orifices 64 or the housing 12 can be configured to carry the coolant gas. In the FIGURE, ducting including feeding holes 68 supplies coolant gas from a source 62 at about 370° C. and 9 bars to a housing cavity 70, maintained at approximately 4 bars, from which the orifices 64 are fed. By carefully sizing the feeding holes 68 relative to the impingement holes 64 it is possible to ensure that a finite amount of cooling air flows through the gap 82 between the heat shield support 56 and the inlet nozzle guide vane support 81 and film cools the outer radius 34 of shield member 32.

After impingement, the coolant gas flows radially inward along the passage 58 cooling surface 66 and thus surface 38 by conduction through shield member 32. In the FIGURE, pedestals or turbulators in the form of protrusions 72 are formed in surface 66 to increase turbulence in the coolant gas and thus augment heat transfer. By appropriately sizing the dimensions of passage 58 and orifices 64, the rate of coolant flow in passage 58 is controlled in accordance with coolant gas and combustion gas temperatures to provide a radially decreasing temperature distribution in shield member 32. The tendency of an annular plate member to distort or "warp" with such a temperature profile is used to advantage in the present invention, in that the warping will cause an increase in the sealing contact force between edge 34 and 56 caused by the controlled flexing of shield member 32 against the spring washer 20. In this manner, the integrity of the coolant passage 58 is maintained during high temperature operation, and unwanted leakage paths for the coolant gas such as between shield edge 34 and support plate edge 56 are precluded.

As further embodied herein, inner edge 36 of shield member 32 and outer edge 42 of shield member 40 overlap to form an intershield gap 74. Also, a series of channels 76 are formed in the overlapped portion of edge 36 to allow coolant gas to flow from passages 58 to gap 74 and then out along the shielding surface 46 of shield member 40 to provide film cooling of surface 46.

Still further embodied herein, the cooling means includes a second source 78 of pressurized coolant gas and associated ducting 80, for supplying coolant gas to gap 60. In the present embodiment, source 78 is the compressor from which air at approximately 120° C. and 2 bars is available. Ducting 80 can be separate or integral with housing 12, or any combinations of coolant gas channeling means can be used. Source 78 could be combined with source 62 in a single source, but it may be advantageous, as depicted in the FIGURE, to have separate coolant gas sources.

It will be apparent to those skilled in the art that various modifications and variations could be made in the heat shields of the present invention without departing from the scope or spirit of the invention.

What is claimed is:

1. Heat shield apparatus for a radial inflow gas turbine, the turbine having a plurality of blades mounted on a hub for rotation about an axis, the combustion gases entering the turbine at an inlet essentially in the radial direction and leaving at an outlet essentially in the axial direction, the apparatus comprising:
   (a) a first shield member in the form of an annular plate positioned concentric with the hub axis and immediately adjacent the turbine inlet;
   (b) a second shield member in the form of an annular plate positioned concentric with the hub axis, said second shield member being essentially co-planar with said first shield member and being positioned adjacent to both said first shield member and the hub, said first and second shield members having respective shielding surfaces facing the combustion gas and the turbine outlet and defining, in part, the combustion gas flow path past the turbine blades;
   (c) means for supporting said first and second shield members; and
   (d) means cooperating with said support means for cooling said first and second shield members,
   wherein said support means includes an annular plate member positioned concentric with the hub axis and axially adjacent said first and second shield members, at least some portions of said support plate being spaced from said first shield member, and wherein said cooling means includes
(i) a first source of pressurized gas at a low temperature, relative to the combustion gas temperature, and
(ii) means for channeling said pressurized low temperature first gas into the space between said first shield member and said support plate for cooling the surface of said first shield member opposite said first shield member shielding surface, and wherein a radially inner edge of said first shield member and an adjacent radially outer edge of said second shield member form an intershield gap, and wherein the heat shield apparatus further includes means for providing a flow path for said pressurized first coolant gas between said first and said second shield members to cooperate with said intershield gap, said first coolant gas flow through said intershield gap for film cooling the shielding surface of said second shield member.

2. Heat shield apparatus as in claim 1 wherein means are provided in the space between said first shield member and said support plate for augmenting heat transfer from said opposite surface.

3. Heat shield apparatus as in claim 2 wherein said heat transfer means includes a plurality of protrusions formed on said opposite surface, the size, location, and number of said protrusions being selected in accordance with the flow rate of said first coolant gas in said coolant space to provide a desired heat transfer coefficient.

4. Heat shield apparatus as in claim 1 wherein a radially inner edge of said second shield member is spaced from, and forms a gap with, the surface of the rotating hub, the apparatus further including
(i) a second source of pressurized coolant gas at a low temperature, relative to the combustion gas temperature, and
(ii) means for channeling said second coolant gas through said hub gap, past said second shield member edge, and into the combustion gas flow path for providing film cooling of said second shield member edge.

5. Heat shield apparatus as in claim 1 wherein a radially outer edge of said first shield member is sealing contacted in the axial direction by said support means around the periphery of said first shield member, and wherein said cooling means provides a first shield member temperature distribution decreasing in the radially inward direction for thermally warping said radially outer edge against said support means to augment the sealing contact force.

6. Heat shield apparatus as in claim 5 wherein means are provided for flexibly attaching said first shield member to said support means.

7. Heat shield apparatus as in claim 1 wherein the radially inner edge of said first plate member overlaps the radially outer edge of said second plate member; wherein the first coolant gas used to provide film cooling for said second shield member is channeled to said intershield gap from the space between said first shield member and said support plate; and wherein said feeding means includes channels formed between the overlapped portions of said first and said second shield members.

8. Heat shield apparatus as in claim 1 wherein said first coolant gas channeling means includes a plurality of holes positioned in the radially outer edge of said support plate for directing jets of said first coolant gas against the portion of said first shield member adjacent the turbine inlet.

9. Heat shield apparatus as in claim 1 wherein the turbine inlet is defined, in part, by a turbine inlet nozzle support member; wherein said first annular shield member is sized and positioned to have the radially outer edge form a gap with said turbine inlet nozzle support member; and wherein said first pressurized gas source also provides gas flow through said nozzle support gap, past said first shield member outer edge, and into the combustion gas flow path for film cooling said first shield member outer edge.

10. Heat shield apparatus as in claim 1 wherein said flow path providing means also cooperates with said space between said first shield member and said support plate for flowing said pressurized first coolant gas from said space to said intershield gap.

11. Heat shield apparatus as in claim 1 wherein said adjacent edges of said first and said second shield members are overlapped to form said intershield gap, and wherein said flow path providing means includes channels formed in at least one of said overlapped edges.

* * * * *